June 4, 1935.  W. J. McCARTNEY ET AL  2,004,077
COUPLING
Filed July 16, 1934  2 Sheets-Sheet 1
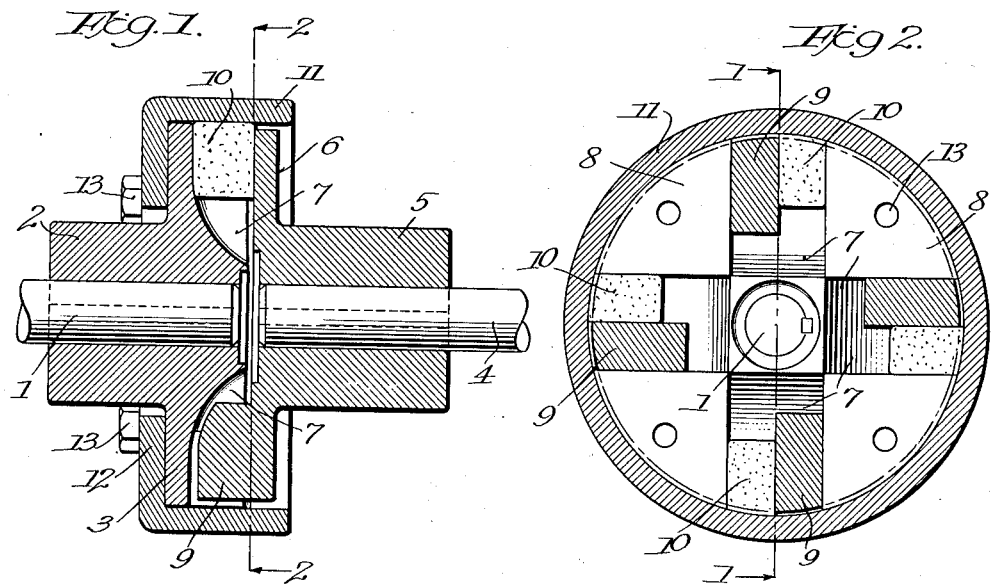
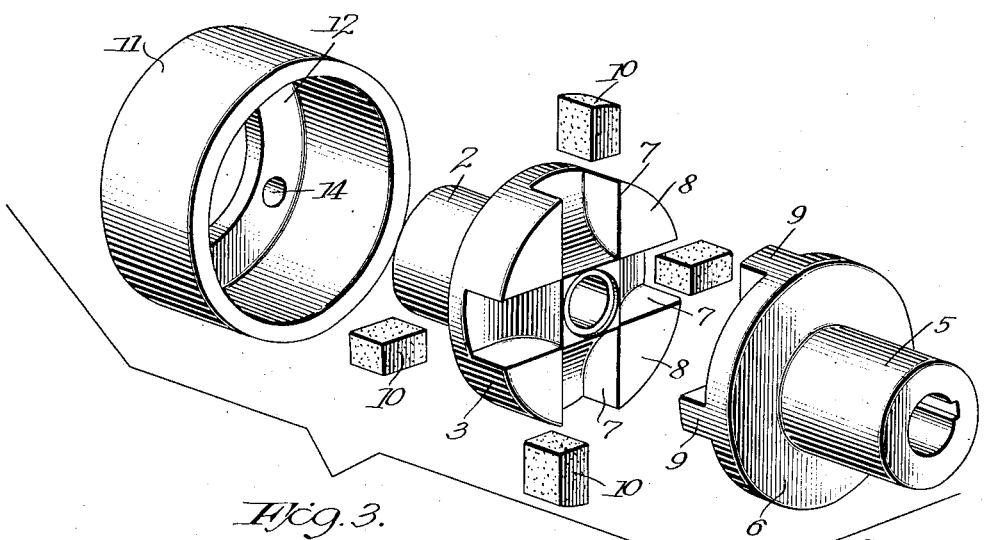
Inventors
William J. McCartney
Spencer T. Bachus

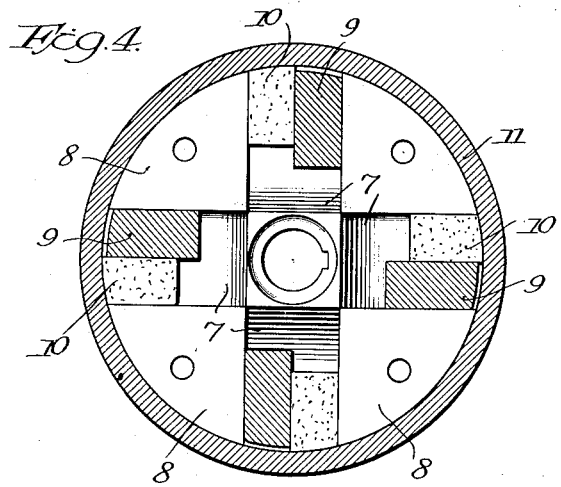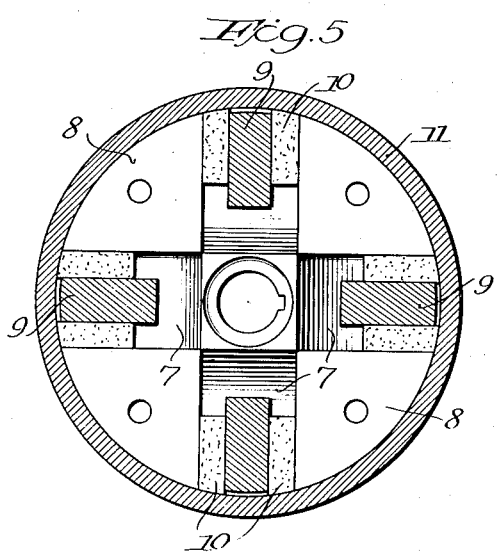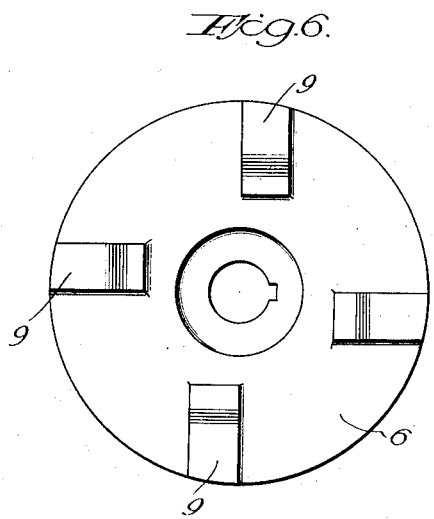

Patented June 4, 1935

2,004,077

UNITED STATES PATENT OFFICE 2,004,077

COUPLING

William J. McCartney and Spencer T. Bachus, Birmingham, Ala.

Application July 16, 1934, Serial No. 735,529

4 Claims. (Cl. 64—96)

The present invention relates to flexible, resilient couplings for shafts and has for its object to provide a coupling which may be economically manufactured and which will be strong, durable and compact.

The invention is particularly described in the following specification, reference being made to the accompanying drawings, in which:

Figure 1 is a section on line 1—1 of Figure 2.

Figure 2 is a section on line 2—2 of Figure 1.

Figure 3 is a perspective view of the disassembled parts.

Figure 4 is a sectional view of a modified form of the invention.

Figure 5 is a sectional view of another modified form of the invention.

Figure 6 is a plan view of the driven element of the coupling.

In these drawings the shaft 1, which for the purpose of this description may be regarded as the driving shaft, has secured thereto a sleeve 2 having a flange or disc 3 at its end. The disc 3 is provided with a central bore adapted to receive the end of the shaft.

A shaft 4, which for the purposes of this description may be regarded as the driven shaft, has secured thereto a sleeve 5 having a flange or disc 6 at its end. The disc 6 is provided with a central bore adapted to receive the end of the shaft.

The disc 3 has formed therein a plurality of slots 7, extending inwardly from its edge, which define an equal number of intervening sectors 8. Each slot, which is relatively wide and has parallel sides, has a bottom surface which curves, or tapers, upwardly substantially from the peripheral edge of the disc toward its center, thus providing a slot which is relatively deep at the circumference of the disc, but which terminates at a line adjacent to the center of the disc.

It will be apparent that the tapering bottom surfaces of the slots thus form, in effect, a truncated pyramid at the center of the disc, the upper surface of which is level with the upper faces of the aforementioned sectors.

The disc 6 has a plurality of off-centered lugs 9 formed on one side thereof and adapted to engage within the slots 7 of the disc 3, the faces of said lugs 9 conforming substantially to the contour of the bottoms of slots 7.

In the preferred adaptations of the invention shown in Figures 1, 2, 3, 4 and 6, which couplings are adapted to be used on shafts turning in one direction, resilient blocks 10, preferably of rubber, are disposed in each slot 7 between the working faces of sectors 8 and lugs 9.

The rubber blocks are laterally disposed with respect to the lugs 9 so that the torsional force will be transmitted from the sectors 8 through the rubber blocks 10 to the lugs.

The blocks 10, which have plane parallel sides, are of such dimensions as to prevent the disc 6 from contacting with the sectors 8, and when these parts are thus axially separated by the rubber blocks, the lugs 9 will not contact with the curved bottom surfaces of slots 7. If the lugs 9 are of considerable radial length they may be tapered at their inner ends, as shown in the drawings, so as to prevent contact with the bottoms of the grooves where the latter are shallow.

It will be observed that the central bore of each disc is reamed, and that the shaft does not extend to the plane of the disc, thus providing greater clearance between the shafts than between the discs.

A cylindrical housing 11 of substantial form and resistance, having an inwardly extending flange 12 is secured to the disc 3 by means of bolts 13 passing through apertures 14 in the flange 12.

The housing 11 is adapted to fit snugly around the disc 3 and sectors 8, and it will prevent the rubber blocks from moving out of the slots 7 even under very considerable radial stress due to extreme pressure. The driven disc 6 is of slightly less diameter than the driving disc 3 so as to permit of a slight degree of bodily or angular movement of the disc 6 within the housing 11.

It will be apparent that the housing 11 forms a protective covering for the coupling, excluding dirt and grit, in addition to performing the important function of holding the rubber blocks always in position and resisting any tendency of the blocks to expand or move outwardly under extreme compression.

The form of the coupling shown in Figure 2 is particularly designed for use where it is intended to rotate the driving disc 3 and sectors 8 in a counter-clockwise direction, as viewed in the figure, and it will be noted that the rubber blocks 10 are positioned between the working, or driving faces of the sectors 8 and the off-centered lugs 9.

The modification shown in Figure 4 is particularly designed for use where it is intended to rotate the driving disc 3 and sectors 8 in a clockwise direction, and, as shown, the rubber blocks 10 are positioned between the working or driving faces of the sectors 8 and the lugs 9, but in positions opposite those shown in Figure 2.

In the two modifications above described, it is desirable that the width of the rubber blocks 10 should be approximately equal to the width of the lugs 9 and that each slot 7 should be wide enough to permit a lug and a rubber block to fit snugly therein. Each lug 9 is, as stated, off-centered, i. e., positioned on the disc 6 so that the working or driven face of the lug is disposed radially with respect to the center of the disc, and in the modification shown, it is diametrically opposite the working face, or side, of the lug on the other side of the axial center.

A further modification of the invention is shown in Figure 4, where, it will be noted, two rubber blocks 10 are placed in each slot 7 on opposite sides of a lug 9 and the lugs are radially disposed about the disc 6. This modified form of the coupling is particularly adapted for use where it is desired to alternate the direction of rotation of the shafts without changing the form of coupling.

A significant feature of this invention is that there is no metal to metal contact between the driving and the driven discs or shafts, because of the intervention of the rubber blocks and, hence, heating of the coupling from, or wear of the metal parts is practically eliminated.

The rubber blocks may be readily replaced when worn, without the necessity of removing the driving disc 3, or the driven disc 6. Such replacement is accomplished by merely unscrewing the bolts 13 and withdrawing the cylindrical resistance housing 11, thus exposing the rubber blocks. The blocks may be readily extracted and new blocks may be inserted by hand, or with the aid of a suitable tool. The housing is then bolted on and the coupling is again ready for use.

The couplings of the present invention are of great strength, and this strength is due largely to the design of the slots 7 in the driving disc 3. As stated above, these slots curve or taper upwardly from the edge of the disc toward a line adjacent the center of the disc, and the truncated pyramid thus formed joins the adjacent sectors and thus provides a driving element of great strength and rigidity. In addition to insuring strength and rigidity of the driving member, the curved bottom surfaces of the slots act to prevent the rubber blocks from moving inwardly, and, due to a compressing action on the blocks, they will be urged outwardly against the cylindrical housing which, as pointed out, forms an effective resistance element to radial movement of the blocks. Furthermore, owing to the curvature of the slots, they may be readily machined.

It will be apparent that the use of the terms "driving" and "driven", in this specification, is arbitrary and for the purpose of illustration only, and that either the shaft 1 and disc 3, or, the shaft 4 and disc 6 may be driven.

It will be understood that the invention is not limited to the details of construction shown in the drawings, and that the phraseology employed in the specification is for the purpose of description and not of limitation.

We claim:

1. In a coupling of the class described, a driving element and a driven element, one of said elements comprising a relatively thick disc having a plurality of radially disposed slots therein, the slots having bottom surfaces which extend inwardly from the outer periphery of the disc and incline upwardly toward and reinforce the central portion of the disc; the other of said elements comprising a disc of approximately the same diameter as the first mentioned disc and having lugs on the face thereof corresponding in number to and engaging the slots in the first mentioned disc, the lugs being of less width than the slots and being of less depth at their inner than at their outer ends so as to conform to the shape of the slots; and resilient means positioned in each slot between a side of the lug and the opposing wall of the slot.

2. In a coupling of the class described, a driving element and a driven element, one of said elements comprising a relatively thick disc having a plurality of radially disposed slots therein, the slots having bottom surfaces which extend inwardly from the outer periphery of the disc and incline upwardly toward and reinforce the central portion of the disc; the other of said elements comprising a disc of approximately the same diameter as the first mentioned disc and having lugs on the face thereof corresponding in number to and engaging the slots in the first mentioned disc, the lugs being of less width than the slots and being of less depth at their inner than at their outer ends so as to conform to the shape of the slots; resilient means positioned between the sides of the lugs and the opposing walls of the slots, and an integral housing encircling and spanning said discs at their peripheries, the discs substantially filling the housing at each end to form a complete retaining enclosure for the coupling parts.

3. In a coupling of the class described, a driving element and a driven element, one of said elements comprising a relatively thick disc having a plurality of radially disposed slots therein, said slots having bottom surfaces which incline upwardly toward and reinforce the central portion of the disc; the other of said elements comprising a disc of approximately the same diameter as the first mentioned disc and having a plurality of lugs on the face thereof corresponding in number to and engaging the slots in the first mentioned disc, the lugs being of less width than the slots and being offset with respect to the radii of the disc so as to abut each lug against one wall of the slot and space it from the other wall of the slot; and a resilient element disposed in each of said spaces between a lug and a slot wall.

4. In a coupling of the class described, a driving element and a driven element, one of said elements comprising a relatively thick disc having a plurality of radially disposed slots therein, the slots having bottom surfaces which extend inwardly from the outer periphery of the disc and incline upwardly toward and reinforce the central portion of the disc; the other of said elements comprising a disc of approximately the same diameter as the first mentioned disc and having lugs on the face thereof corresponding in number to and engaging the slots in the first mentioned disc, the lugs being of less width than the slots and being of less depth at their inner than at their outer ends so as to conform to the shape of the slots; and resilient means positioned on opposite sides of each lug between the lug and the opposing slot walls.

WILLIAM J. McCARTNEY.
SPENCER T. BACHUS.